US009873569B1

(12) United States Patent
Frohlich et al.

(10) Patent No.: US 9,873,569 B1
(45) Date of Patent: Jan. 23, 2018

(54) CONTAINER TREATMENT MACHINE

(71) Applicant: KHS GmbH, Dortmund (DE)

(72) Inventors: Heinrich-Dieter Frohlich, Bad Kreuznach (DE); Thomas Matheyka, Eppstein (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 15/205,330

(22) Filed: Jul. 8, 2016

(51) Int. Cl.

| | |
|---|---|
| ***B65G 21/10*** | (2006.01) |
| ***B65G 41/00*** | (2006.01) |
| ***B65B 3/04*** | (2006.01) |
| ***B65B 43/52*** | (2006.01) |
| ***B08B 9/08*** | (2006.01) |
| ***B65G 15/00*** | (2006.01) |
| ***B65G 37/02*** | (2006.01) |
| ***B67C 3/22*** | (2006.01) |
| ***B67C 3/30*** | (2006.01) |
| ***B67C 7/00*** | (2006.01) |
| *B65G 37/00* | (2006.01) |

(52) U.S. Cl.
CPC .......... *B65G 41/007* (2013.01); *B08B 9/0804* (2013.01); *B65B 3/04* (2013.01); *B65B 43/52* (2013.01); *B65G 15/00* (2013.01); *B65G 37/02* (2013.01); *B67C 3/22* (2013.01); *B67C 3/30* (2013.01); *B67C 7/002* (2013.01); *B65G 2201/0235* (2013.01); *B65G 2207/30* (2013.01)

(58) Field of Classification Search
CPC ....... B65G 21/06; B65G 21/10; B23P 21/004; B08B 9/42; B08B 9/44
USPC ........ 198/860.2, 347.4, 580; 134/43, 48, 49, 134/61
See application file for complete search history.

(56) References Cited

U.S. PATENT DOCUMENTS

| | | | | |
|---|---|---|---|---|
| 3,122,231 | A * | 2/1964 | Pence | B07C 1/02 198/347.4 |
| 3,315,778 | A * | 4/1967 | Kendall, Jr. | B23Q 7/1489 198/345.3 |
| 3,370,720 | A * | 2/1968 | Schickle | B08B 9/0804 134/133 |
| 3,454,018 | A * | 7/1969 | Ruddick Maurice | B08B 9/0804 134/133 |
| 4,803,055 | A * | 2/1989 | Ueda | B65B 55/10 134/48 |
| 7,308,757 | B2 * | 12/2007 | Fukuhara | H01L 21/67727 198/465.2 |
| 2006/0070847 | A1 * | 4/2006 | Besch | B65G 1/0492 198/347.4 |

(Continued)

FOREIGN PATENT DOCUMENTS

| | | |
|---|---|---|
| DE | 8801739 | 5/1988 |
| DE | 29520844 | 3/1996 |
| DE | 202007015871 | 3/2008 |

*Primary Examiner* — James R Bidwell
(74) *Attorney, Agent, or Firm* — Occhiuti & Rohlicek LLP

(57) ABSTRACT

A container-treatment machine includes a frame, transport devices for conveying containers, and intermediate conveyors. Treatment stations, some of which are treatment modules, are arranged between the first and second transport-devices. The intermediate conveyors convey containers to corresponding ones of the treatment stations. The intermediate conveyors extend transversely between the transport devices. Some of the treatment modules are held on the frame so as to be removable from operating positions thereof.

22 Claims, 7 Drawing Sheets

(56) References Cited

U.S. PATENT DOCUMENTS

| | | | | |
|---|---|---|---|---|
| 2012/0318306 | A1* | 12/2012 | Jeong | B08B 3/02<br>134/61 |
| 2015/0352607 | A1* | 12/2015 | Fickert | B08B 9/0813<br>134/22.18 |

* cited by examiner

CONTAINER TREATMENT MACHINE

RELATED APPLICATIONS

Field of Invention

The present invention relates to a container treatment machine comprising treatment stations for such containers as, a filling station and a cleaning station, where the containers are large cans, small casks or kegs, with these kegs comprising valve closures, so-called fittings etc.

Background

A typical container treatment machine contains at least one first transport device for the containers. The first transport device constitutes either the container infeed or is connected to an external container infeed such as a conveyor belt or a container gripper or robot station feeding the containers to the container treatment machine via the first transport device.

The container treatment machine also has at least one second transport device for the containers which is disposed parallel to the first transport device and which either forms the container discharge, or is directly or indirectly connected to a discharge for the containers so that the containers are discharged from the container treatment machine via the second transport device. The treatment stations for the containers are arranged between the first and the second transport device. Intermediate conveyors are associated with at least a part of the treatment stations in order to feed the containers to the associated treatment stations. These intermediate conveyors extend preferably between the transport devices. The transport devices do not need to run exactly parallel with one another. Deviations of, say, +/−20 degrees are possible and are within the scope of the present invention.

SUMMARY

It is AN object of the invention to provide a container treatment machine that is individually configurable and enables containers to be handled effectively and flexibly.

According to the invention, at least some of the treatment stations are treatment modules of identical or broadly identical construction and the container treatment machine comprises a frame in which the treatment modules are held so as to be removable from an operating position. The container treatment machine preferably comprises a frame in which the treatment stations are held. Ideally all treatment stations of the container treatment machine are constructed as treatment modules of identical or broadly identical construction. In this way, through the use of a desired number and desired type of container treatment modules the container treatment machine can be adapted very simply to different treatment processes or can be extended as regards throughput. For example the frame of the container treatment machine can comprise a particular length, to accommodate fifteen treatment stations for example. Because of the modular identical or broadly identical configuration of the mechanical and electrical interfaces of the treatment stations, It is now possible to configure their layout in the frame in any desired arrangement, e.g. two pre-cleaning stations, four main cleaning stations, two inspection and test stations, one transfer conveyor and two filling stations. This allows the container treatment machine to be individually configured to suit very different tasks.

Preferably at least one treatment module comprises an associated intermediate conveyor. In this way, the module contains not just the treatment station (e.g. filling station, pre-cleaning station, main cleaning station, inspection and test station) but also the associated intermediate conveyor which usually comprises an endless conveyor element which can however also comprise a gripper device as is necessary for example when filling kegs that have valves, when the keg has to be turned round to be filled.

In an ideal configuration the treatment modules as an autonomous subassembly or structural unit are constructed in such a way that they can be independently operated following their suitable connection to a fluid source, power supply and control unit.

In an advantageous embodiment of the invention, the treatment module is held and/or secured in or on the frame by way of a push-fit connection. In this way it is held securely and removably on the frame and can also be easily removed.

Preferably the treatment module is held so it can be displaced on the frame by way of a guide rail. As a result of this arrangement the treatment module can be mounted in the frame in a defined manner and be securely guided in the guide rail in its operating position on the frame. In this embodiment, the treatment module in its guide rail can also be easily fixed in its operating position.

The operating position of each treatment module is preferably secured in the frame by a detent apparatus so that a defined arrangement of the treatment module in the frame is assured, as a result of which interfaces such as fluid interfaces, electrical interfaces and control interfaces, possibly also mechanical interfaces (actuators) of the treatment module and of the container treatment machine also couple up well with one another.

In an advantageous embodiment of the invention, there is disposed on the frame at each operating position of a treatment module a fluid interface that is connected to central fluid lines of the container treatment machine and that comprises at least one coupling flange that interacts with a complementary coupling flange of the treatment module that is connected to the fluid lines of the treatment module. In this way, once installed in its operating position the treatment module is securely supplied with the necessary fluids such as sterilization medium, product, air, hydraulic fluid, etc.

The coupling flange and the complementary coupling flange are preferably arranged so that they couple together when the treatment module is moved to the operating position. This results in an automatic and secure coupling together of the fluid lines in a single operation when the treatment module is pushed into position, thereby simplifying the work, ensuring secure connections, and improving the protection of the interfaces because the connecting process is always carried out in a defined manner as the treatment module is positioned.

In an advantageous embodiment of the invention, an electrical interface connected to electrical lines of the container treatment machine is present at each operating position of a treatment module in or on the frame. A complementary interface for electrical lines of the treatment module and which can be connected to the interface of the container treatment machine is arranged on the treatment module. This interface provides a secure electrical connection of the treatment module to the container treatment machine and one that is free from operator error.

The interface and the complementary interface are preferably arranged so that they couple together when the treatment module is moved to the operating position. This leads to an automatic secure coupling together of the electrical lines in a single operation when the treatment module is pushed into position, thereby simplifying the work, ensuring secure connections and improving the protection of the interfaces because the connecting process is always carried out in a defined manner as the treatment module is positioned.

Each treatment module is preferably connected to a controller of the container treatment machine by way of an electrical bus system. On the frame, a first connection element is arranged in a locally fixed position relative to the operating position of each treatment module. The first connection element interacts with a complementary second connection element arranged on the treatment module in such a way that when the treatment module is pushed or coupled into the frame, the first and second connection elements contact each other no later than when the treatment module has reached its operating position in the frame. In this way a reliable connection of the control lines is ensured, making for increased operational safety and reliability.

The interfaces/connection elements are preferably standardized for all different types of treatment module so that any desired treatment modules can be arranged at the plug-in positions.

The treatment modules preferably comprise first support structures and/or frame elements that, when the treatment modules are in the operating position, can be mated together with second support structures and/or frame elements that are configured on the frame. A secure fixing of the treatment modules to the frame in their operating position is effected in this way.

At least some of the treatment modules preferably comprise at least one switchable guide element or deflection element that can be actuated in such a way that, when the treatment module is in the operating position, it can engage in the conveying region of at least one of the transport devices. In this manner the treatment module also contains the guide elements needed to ensure the flow of containers from the transport devices to the associated intermediate conveyor. The deflection elements can also be individualized for the related treatment station in this way.

A transport path of a container is preferably formed from at least two sections of the first transport device, at least one intermediate conveyor and at least one section of the second transport device, running in the shape of a meander.

The conveying direction of the intermediate conveyor of at least some of the treatment modules is reversible so that the treatment sequence of the containers can be influenced as a result.

Preferably the transport devices are endless conveyors such as conveyor belts or elliptically displaceable lifting beams.

The conveying direction of the first and second transport devices is preferably the same.

Preferably, the intermediate conveyors convey in a contrary conveying direction. This means that at least one intermediate conveyor conveys from the first to the second transport device and a further intermediate conveyor conveys from the second transport device to the first. In this way it is possible for a container on its path from the first transport device to the second transport device to pass through a treatment station more than once because the contrary conveying direction of at least two intermediate conveyors can move a container over a meandering transport path between the two transport devices and correspondingly multiple treatment stations.

As a result of the foregoing, it becomes possible to guide a heavily contaminated container through a pre-cleaning station, through a main cleaning station and then, if it is still not completely clean, through a main cleaning station again before feeding it to the filling station. This is possible, for example, if main cleaning stations are arranged in sequence between the two transport devices and at least two of the associated intermediate conveyors comprise a contrary conveying direction.

In this way, treatment stations requiring a long or longer treatment and/or residence time can also be provided in multiples or more frequently within the machine than those requiring only a very short or shorter treatment time.

Through an individual selection of the transport path therefore, the containers can undergo different treatments allowing them to be treated more or less individually depending on their required treatment and/or residence time or their degree of contamination. This allows the treatment, and in particular the cleaning and filling, of containers that initially have very different levels of contamination. Thus, the transport path of a container preferably comprises at least two sections of the first transport device, at least one intermediate conveyor and at least one, preferably two sections of the second transport device. The container meanders along a serpentine path that extends between the two transport devices. As already suggested above, an individual treatment of each single container, including as a function of the particular treatment step, can be effected as a result of this guiding of the containers in the container treatment machine.

To this end it is preferable if at least one treatment station is configured as a cleaning station and at least one treatment station as a filling station. In this case the container treatment machine allows the containers to be cleaned as well as filled with a desired product. If a plurality of cleaning stations are arranged in the container treatment machine, then an individual cleaning of the different containers is possible because each container can run either only through one cleaning station or a plurality or cleaning stations in succession depending on its degree of contamination. Also, as previously indicated, a longer cleaning and residence time can also be simply provided in the plurality of cleaning stations without having to limit the capacity in the concluding rapid filling step.

At least one treatment station is preferably configured as a pre-cleaning station and at least one treatment station as a main cleaning station so that in this way more heavily contaminated containers can be cleaned so as to make them suitable for re-filling with a product.

Preferably at least one treatment station is configured as an external cleaning station which ensures that the containers are also cleaned on the outside and acquire an appealing outward appearance as a result.

In an advantageous embodiment of the invention, at least one treatment station is configured as a buffer station for the holding and pausing of containers. This embodiment of the invention is very advantageous because it means that treatment backlogs which can come about as a result of different treatment speeds of the cleaning stations and filling stations can be buffered out without this leading to stoppages in the operating sequence of the container treatment machine. On the control system side, this embodiment also provides a degree of freedom to achieve optimum occupancy of the first and second transport devices and hence an improved overall performance.

In an advantageous embodiment of the invention the container treatment machine comprises at least one third transport device that is arranged parallel adjacent to the first or second transport device and preferably comprises a conveying direction that runs contrary to that of the latter. This third transport device is connected to at least one intermediate conveyor and/or a separate transfer conveyor. This third transport device can be used to return containers contrary to the transport direction of the first two transport devices and back to an earlier treatment phase, e.g. to the beginning of a sequence of cleaning stations. While the first and second transport devices regularly have an identical conveying direction, an individual treatment of the containers is limited by the fact that for example only a limited number of cleaning stations is arranged between the first and second transport device. With a heavily contaminated container therefore the transport path can only be extended to the extent that this container passes through each of the cleaning stations which have sequentially different conveying directions of their associated intermediate conveyor. If the container were then still dirty after passing through the last cleaning station it would have to be ejected or disposed of. By providing the third transport device therefore, this still contaminated container can now be transferred via the third transport device back to the start of the entire processing of the treatment machine where it is fed again for example to a pre-cleaning station and to the sequence of cleaning stations. By providing the third transport device therefore, in addition to the meander-shaped transport path an extension of the transport path can be achieved in that the container is returned to the start and runs through the meander-shaped transport path for a second time. The third transport device therefore hugely increases the individual treatment options for the containers. The third transport device is preferably connected to the inspection and test station or it is controlled by the latter so that the third transport device can be activated or a container can be transferred to it if the inspection and test station finds that the container is still contaminated even after it has passed through all the cleaning steps.

Preferably an inspection and test station causes the containers to be transferred to a third transport device and in the treatment machine to be conveyed to a previous treatment station. This makes it possible for a container to be able to repeatedly undergo a cleaning cycle through a plurality of cleaning stations in that after passing through the cleaning stations it is returned by the third transport device to upstream of the first cleaning station. Preferably the containers can also be diverted by the third transport device to a container disposal or container discharge station.

The container treatment machine and all embodiments are provided and suitable in particular for treating and filling conventional kegs or casks which have a valve, for which purpose it is necessary in the associated treatment module to turn them upside down and to press the keg onto its valve by way of a ram.

The container transport alone could of course also be effected with the valve or opening on top, but as a rule the container will not be turned in the container treatment machine, i.e. it will be conveyed upside down throughout.

The treatment modules are preferably complete and interchangeable treatment stations which in principle are self-contained (after appropriate connection to fluids, energy and controller) and able to operate independently of the others, for example if containers were adjusted manually.

The following terms are used synonymously: treatment station—treatment module—container treatment station—container treatment module; transfer conveyor—intermediate conveyor; container treatment machine—treatment machine—machine; cleaning module—cleaning station; filling module—filling station; machine controller—controller of the container treatment machine; transport device—conveyor belt—endless conveyor It will be apparent to the skilled person that the embodiments of the invention described above can be combined with one another in any desired way. Individual components of the invention can be provided singly or in multiples. The invention is described below by way of example with reference to the schematic drawings, in which:

DETAILED DESCRIPTION

Figure 1:
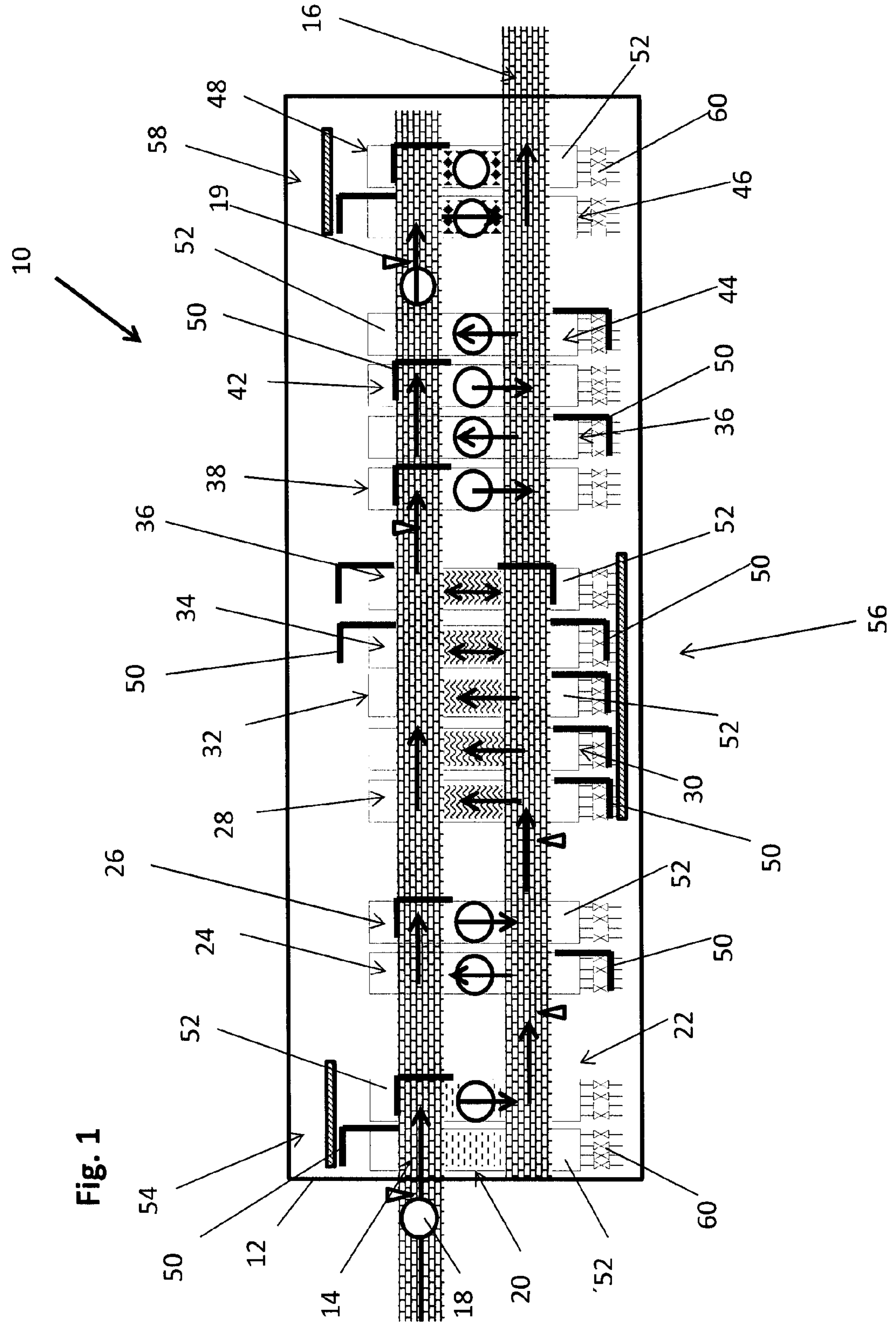
FIG. 1 shows a schematic view of a container treatment machine which has two transport devices and fifteen treatment stations disposed between them.

A container treatment machine 10, as shown in FIG. 1, comprises a frame 12 in which are arranged parallel, or approximately parallel, first and second transport devices 14, 16, examples of which include endless conveyor belts. The first and second transport devices 14, 16 preferably convey in the same conveying direction. In some embodiments, the transport devices 14, 16 include switchable travel-stops 19. In the illustrated embodiment, the first transport device 14 forms a feeder for the containers 18 to the container treatment machine 10 or is connected to an external container feeder.

The second transport device 16 either discharges the containers 18 from the machine or connects to an external container discharge. Treatment stations 20, 22, 24 . . . 48, which are preferably each modular and can be in latched or pushed into the frame 12, are arranged between the first and second transport devices 14, 16. Each treatment station 20, 22, 24 . . . 48 preferably has its own deflection element 50 to transfer the containers 18 from one of the two transport devices 14, 16 to an intermediate conveyor 52 associated with a treatment station 20, 22, 24 . . . 48.

The treatment stations can also be brought together as a combined module to form a treatment group. An example of a treatment group is a pre-cleaning group 54. Such a pre-cleaning group 54 can be formed from the first two pre-cleaning modules 20, 22 that are encountered as one progresses along the conveying direction. Two transfer stations 24, 26 facilitate reciprocal transfer between transport devices 14, 16 in both directions.

In many cases, a treatment module will introduce a fluid into a container 18. Examples of a fluid include hot water, acid, or a base. In many cases, this fluid needs to act for an extended period.

Instead of occupying an outlet valve at the treatment station, a container 18 filled with such a fluid might instead spend this waiting time while elsewhere. For example, the container 18 might instead wait at a transfer module 24, 26. The transfer module 24, 26 thus acts as a waiting or residence station at which the fluid introduced by an upstream treatment module is given time to act. In some embodiments, the fluid thus introduced can also be drained away from the container 18 at the transfer module 24, 26.

A cleaning group 56 follows the transfer modules 24, 26. The illustrated cleaning group 56 comprises five cleaning modules 28, 30, 32, 34, 36. The first three cleaning modules 28, 30, 32 have intermediate conveyors 52 that move in a first conveying direction. The last two cleaning modules 34, 36 also have intermediate conveyors 52. In some embodiments, the intermediate conveyors 52 move in a second conveying direction that is contrary to the first conveying direction. Alternatively, these last intermediate conveyors 52 convey in reversible directions.

Each treatment module 20-48 has a fluid interface 60. Pushing a treatment module 20-48 into the frame 12 couples this fluid interface 60 automatically to the container-treatment machine's own fluid interface. This permits connection of the treatment module 20-48 to the container-treatment machine's own fluid feed.

A guide rail or detent device locks treatment modules at their respective operating positions in or on the frame 12 of the container-treatment machine 10. As indicated by the arrows on the first and second transport devices 12, 14 and intermediate conveyors 52, as a container 18 moves through container-treatment machine 10 it follows a serpentine path that enables it to be treated individually in different ways.

Figure 2:
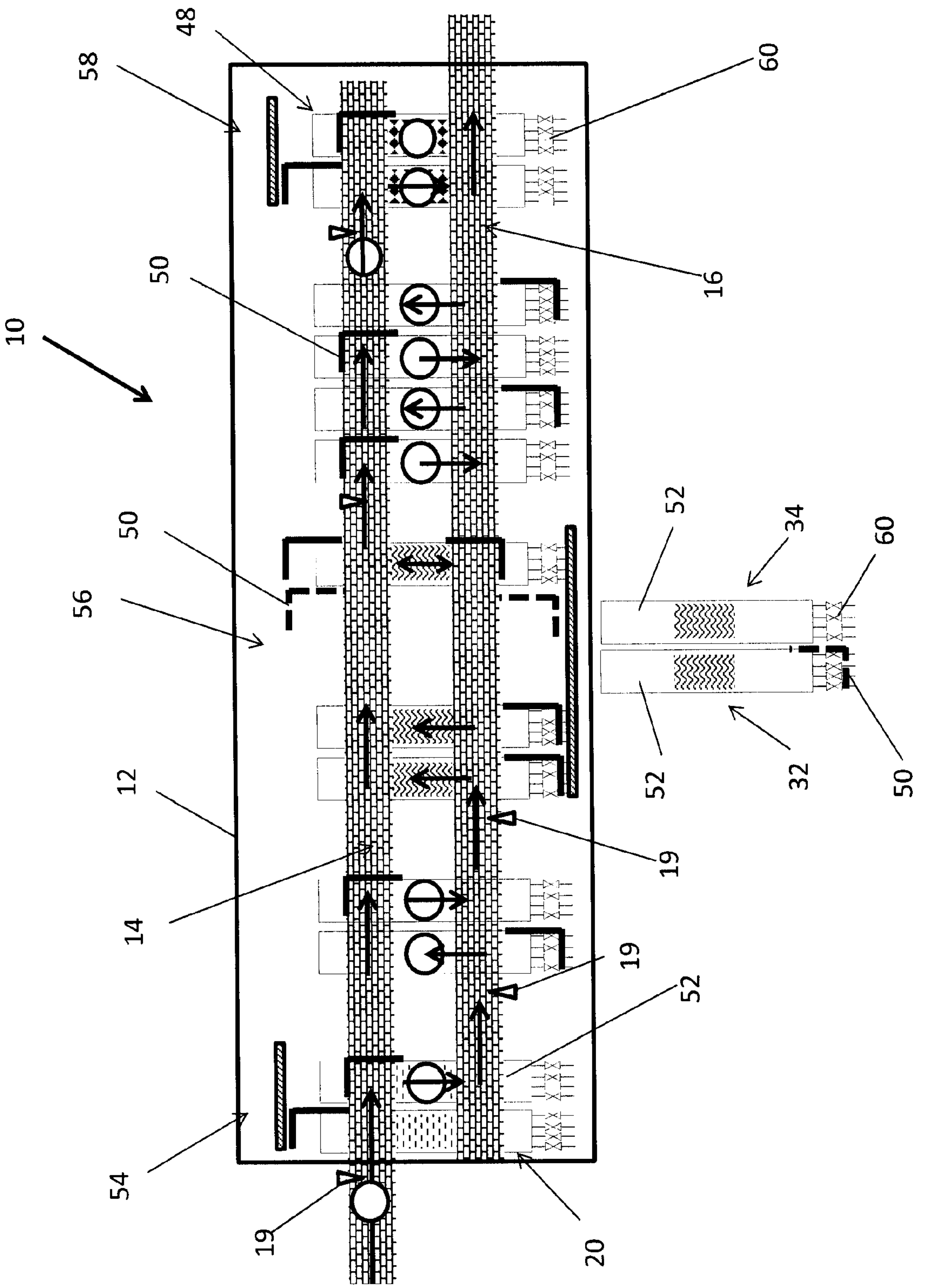
FIG. 2 shows a view according to FIG. 1 in which two cleaning stations in the manner of cleaning modules have been removed from the container treatment machine.

FIG. 2 shows the container-treatment machine 10 of FIG. 1 following removal of two removable cleaning modules 32, 34, together with their associated intermediate conveyors 52. The removability of these and other treatment modules means that modules can easily and quickly be removed or replaced. This modular design thus avoids lengthy downtimes associated with having to shut down the container-treatment machine 10 during repairs.

Figure 3:
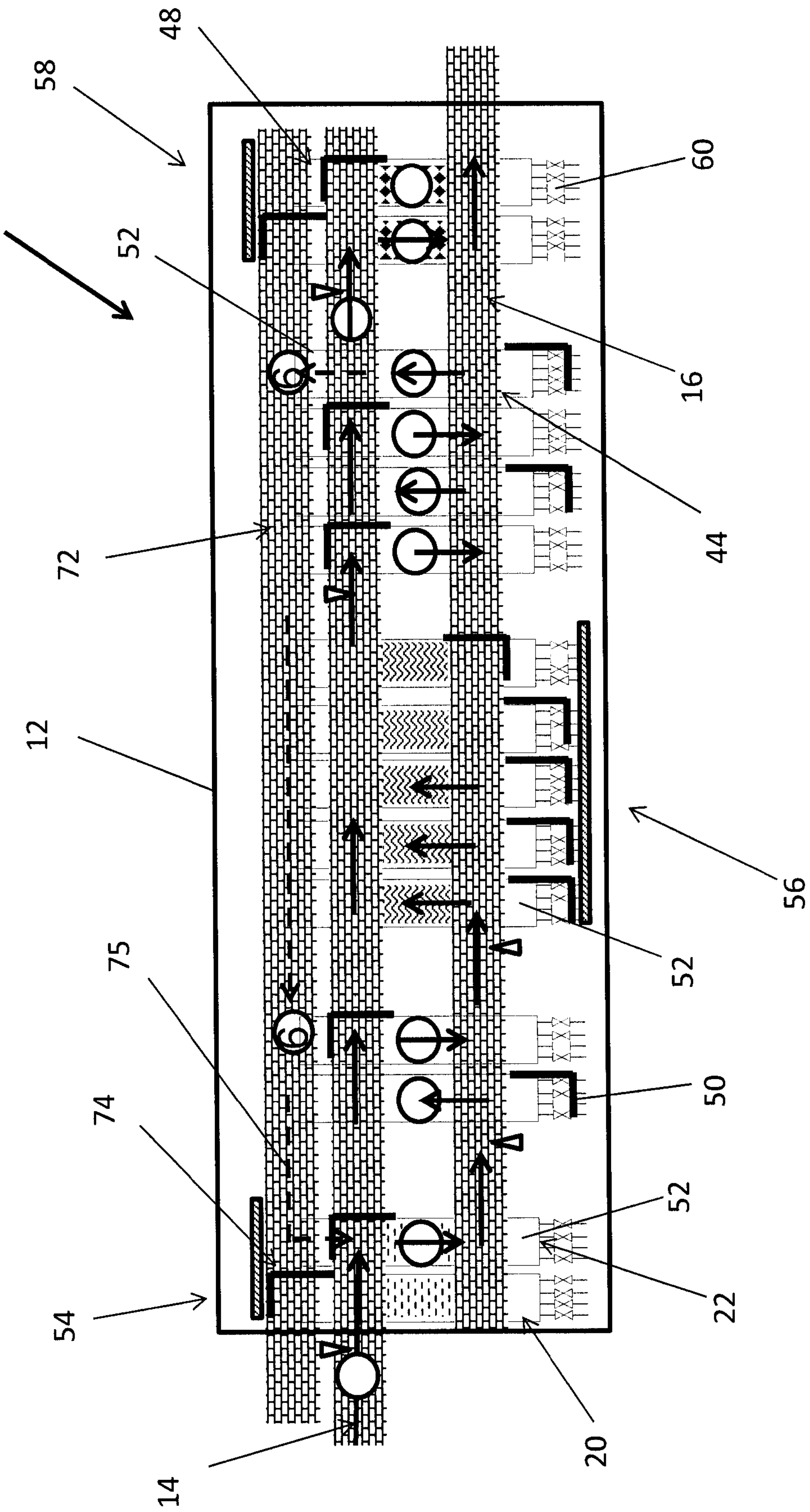
FIG. 3 shows a container treatment machine similar to FIG. 2 having an additionally arranged third transport device.

FIG. 3 shows a container-treatment machine 70 that is configured in a manner similar to that shown in FIGS. 1 and 2. This second embodiment of container-treatment machine 70 includes a third transport device 72 that conveys in a conveying direction that runs contrary to those of the first and second transport devices.

In this case, the sensor and test station 44 of the container-treatment machine 70 is configured so as to transfer unsatisfactorily treated containers to the third container transport device 72 where they are then fed along a return path 75 back to the pre-cleaning station 22 by way of a deflection apparatus 74 of the third transport device 72. The sensor and test station 44 could, for example, detect residual amounts of cleaning and rinsing fluids or residual contamination. After having been sent back via the return path 75, rejected containers 18 have a second chance to undergo the complete cleaning cycle or parts of the cleaning cycle of the cleaning group 56. The third transport device 72 therefore makes it possible to treat different containers in different ways according to their individual needs.

Figure 4:
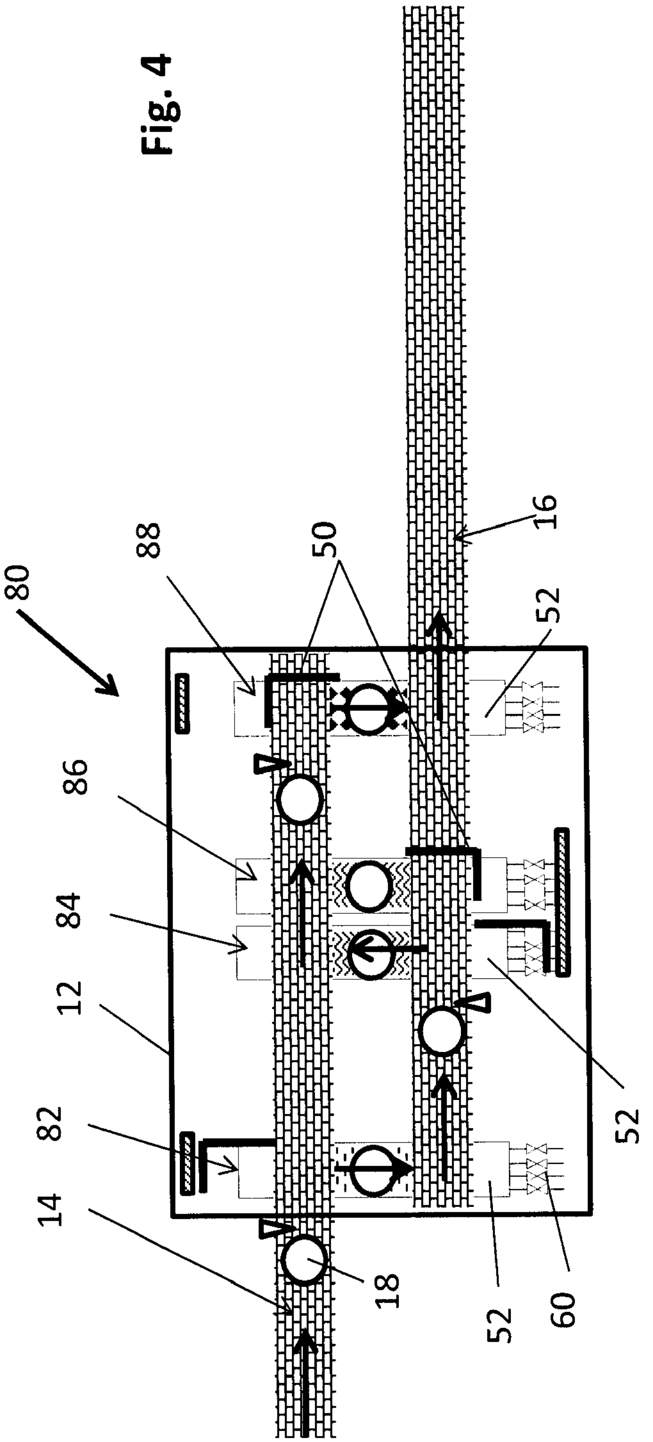
FIG. 4 shows a smaller container treatment machine for treating returnable kegs.

FIG. 4 shows a third embodiment of a container-treatment machine 80 that is significantly smaller than that shown in FIGS. 1 to 3. The container-treatment machine 80 also has a frame 12 that holds a pre-cleaning module 82, two main cleaning modules 84, 86 and a filling module 88. These components can readily be detached from the frame 12. A relatively small system of this type allows the treatment, i.e. pre-cleaning, cleaning and filling, of returnable kegs as well as other returnable containers.

Figure 5:
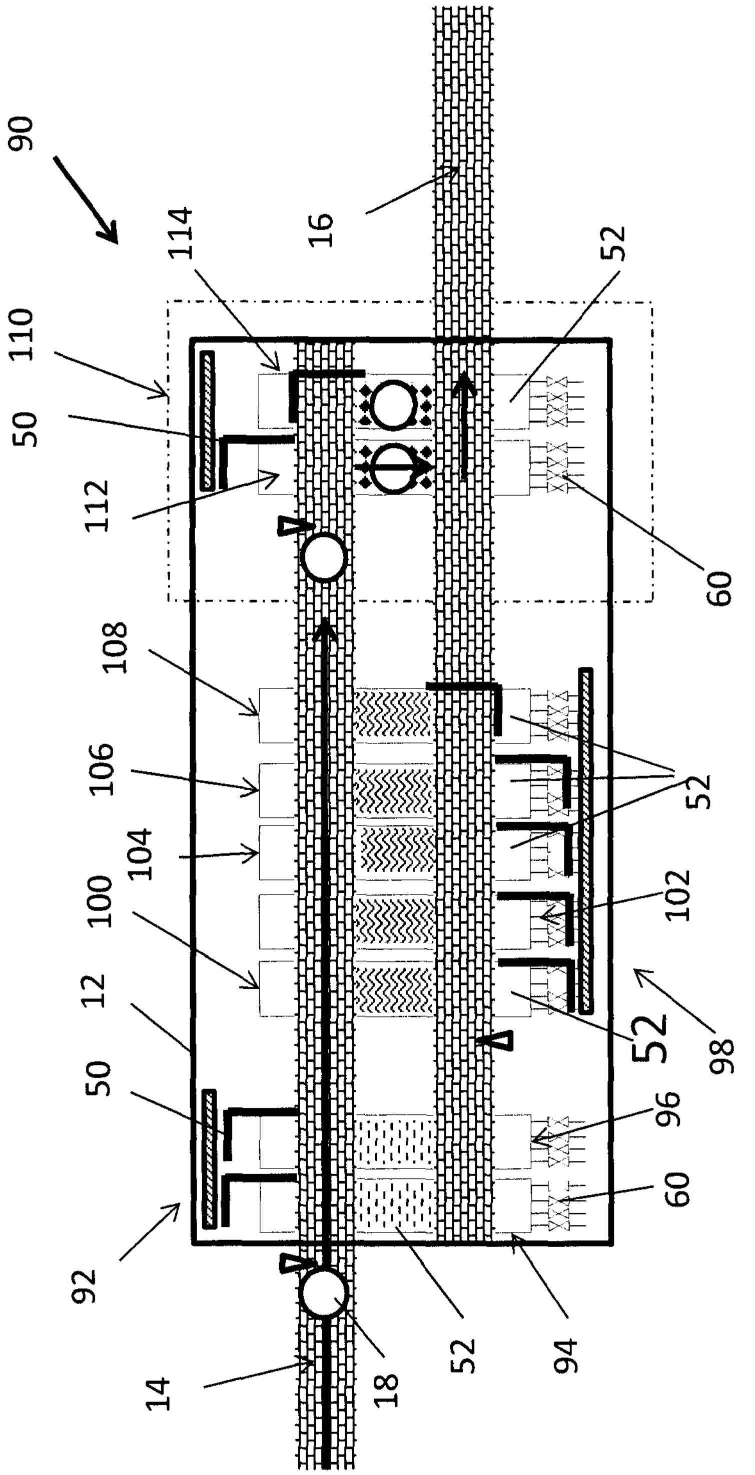
FIG. 5 shows a schematic representation of a larger container treatment machine for treating returnable kegs and non-returnable kegs.

FIG. 5 shows a fourth embodiment of a container-treatment machine 90 that contains a pre-cleaning group 92 with two pre-cleaning modules 94, 96, a first cleaning group 98 with five cleaning modules 100-108, and a filling group 110 with two filling modules 112, 114. The container-treatment machine 90 processes returnable kegs. These kegs run through the pre-cleaning group 92 and the cleaning group 98. The container-treatment machine 90 is also suitable for filling non-returnable kegs. These kegs run via the first transport device 14 straight to the filling group 110, which then uses the two filling modules 112, 114 to simultaneously fill pairs of containers in the two filling modules. Once filled, these containers are transferred to second transport device 16.

The fourth embodiment of a container-treatment machine 90 can also be adapted to process new or non-returnable containers, which need no cleaning. These new containers are guided past all intermediate conveyors 52 and/or cleaning groups 92, 98 and are passed directly to the treatment modules of the filling group 110. Alternatively, the containers 18 could also be guided and treated in a kind of cleaning operation coming from the first transport device 14 by way of the pre-cleaning group 92. Once rinsed in this way, the containers 18 would then be returned via a deactivated cleaning group 98, i.e. without containers 18 being treated with a fluid, back to the first transport device 14 and from there to the filling group 110 or to the filling modules.

Figure 6:
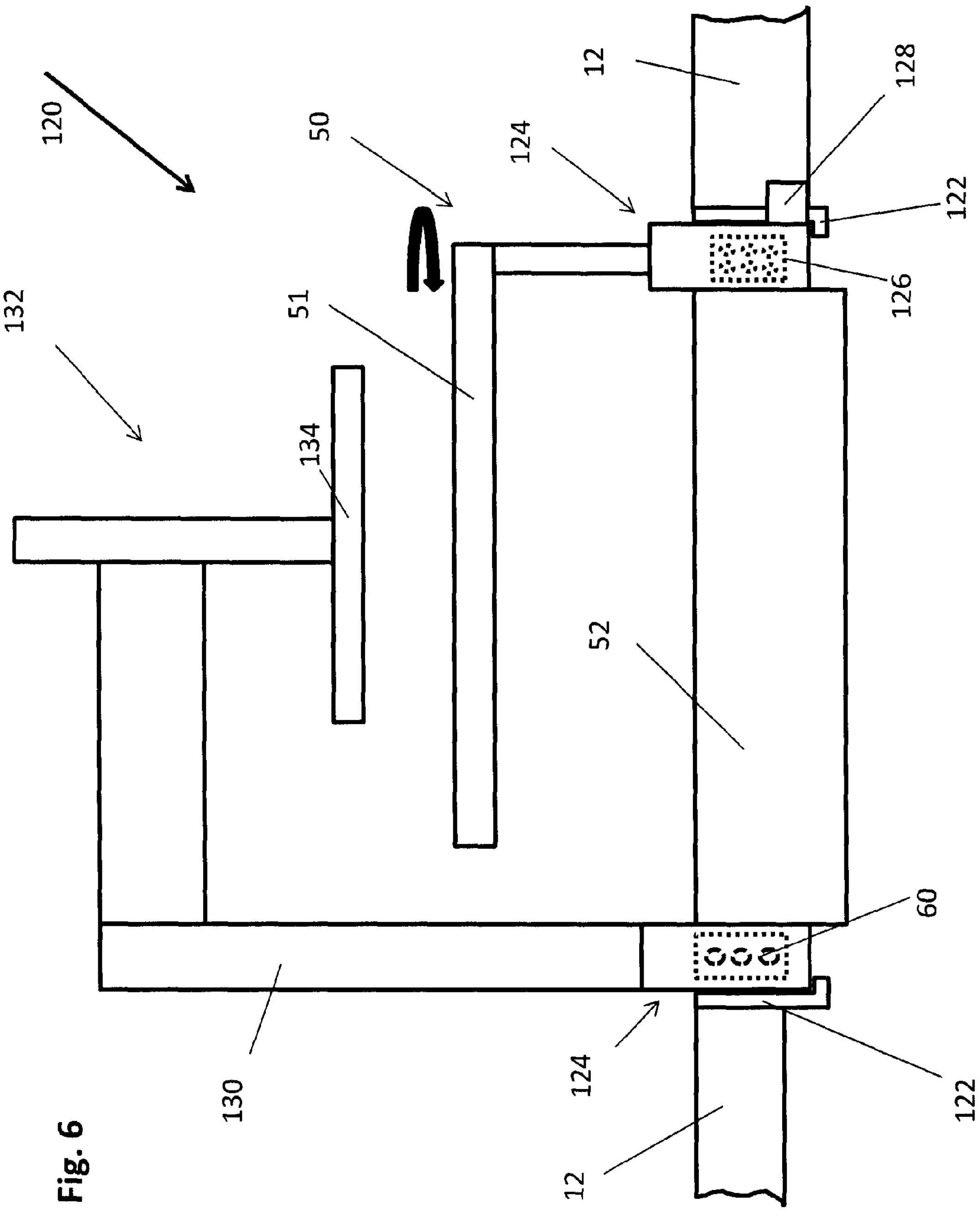
FIG. 6 shows a schematic view of a filling module pushed into a guide rail of the frame of the container module.

FIG. 6 shows a presser element 132 of a filling module 120. The presser element 132, which is operated by a linear drive, includes a presser molding 134 at a lower-end thereof. A module frame 124 holds the presser element 132 to a guide rail 122, and ultimately, to the frame 12. This modular frame 124 is complementary to the guide rail 122. A detent connection 128 secures the filling module 120 on the frame 12.

An intermediate conveyor 52 is held inside the frame 12. In some embodiments, the intermediate conveyor 52 is an endless belt.

A deflector element 50 having a horizontal guide 51 is held on the right-hand side of module frame 124 in such a way as to enable it to rotate. A vertical holder 130 mounts the presser element 132 of the filling station 120 on the left-hand side of the module frame 124.

On the end face of the module frame 124 are both a fluid interface 60 and an electrical interface 126. These interact with complementary corresponding interfaces on the frame 12 when filling module 120 is pushed into the operating position. The interfaces are standardized for all different types of treatment module so that any desired treatment modules can be arranged at the plug-in positions.

It is will be apparent to the skilled person that the above mentioned treatment modules do not necessarily have to be modular. They can also be permanently installed in the frame 12 of a container-treatment machine 10, 70, 80, 90.

Figure 7:
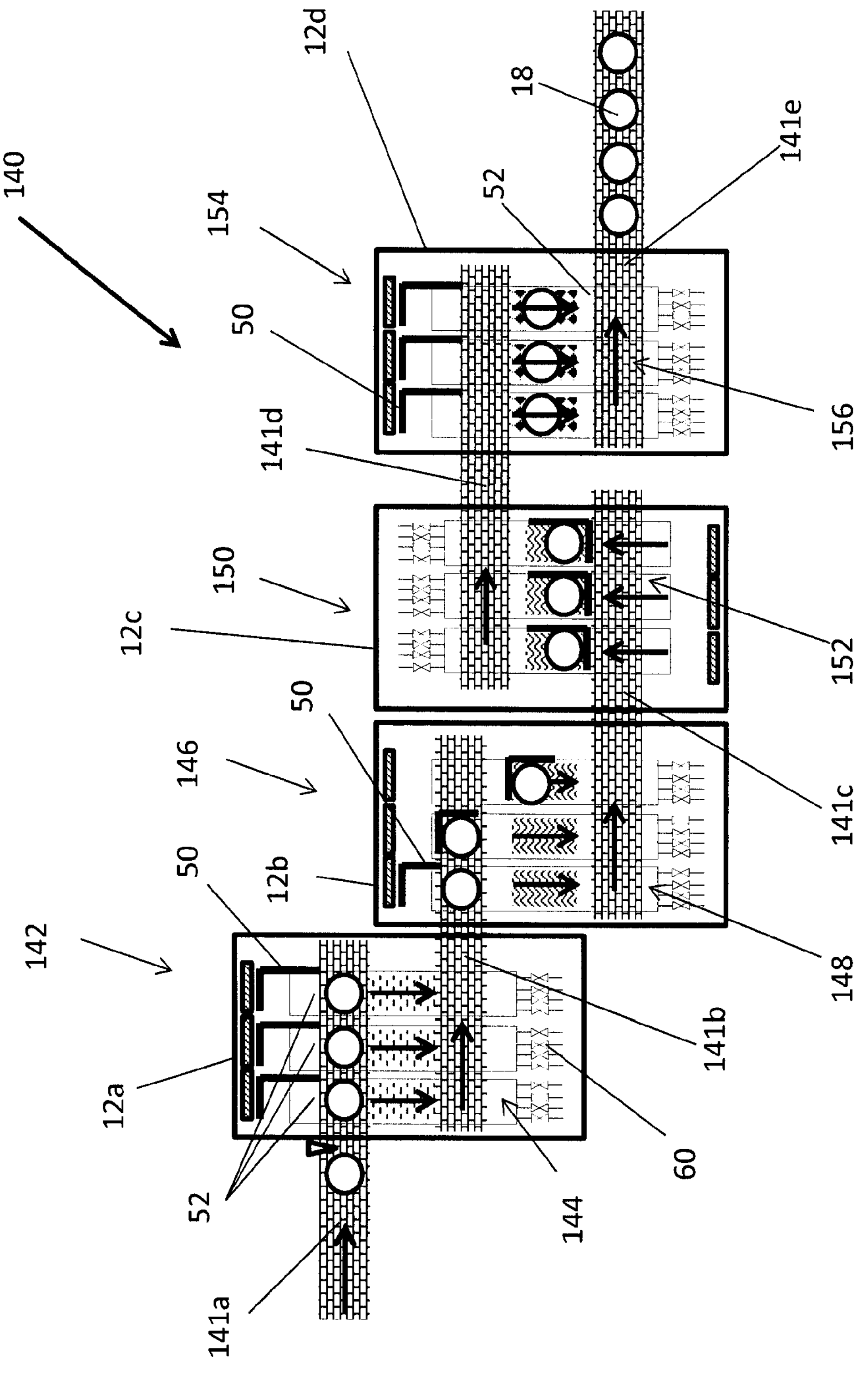
FIG. 7 shows a view of a container treatment machine according to FIG. 1 which has more than two transport devices between which are arranged treatment modules having the same action that are combined to form treatment groups.

FIG. 7 shows a treatment machine 140 having comprises five parallel transport devices 141*a*, 141*b*, 141*c*, 141*d*, 141*e*.

A pre-cleaning group 142 having three pre-cleaning modules 144 is arranged between the first two transport devices 141*a*, 141*b* in a first frame section 12*a* of the container treatment machine 140. A first main cleaning-group 146 having three main cleaning-modules 148 is arranged between the second and third transport devices 141*b*, 141*c* in a second frame section 12*b* of the container treatment machine. A second main cleaning-group 150 having three main cleaning-modules 152 is arranged between the third and fourth transport devices 141*c*, 141*d* in a third frame section 12*c*. Finally, a filling group 154 having three, preferably identical filling modules 156 is arranged between the fourth and fifth transport devices 141*d*, 141*e* in a fourth frame section 12*d*.

In a preferred embodiment, the pre-cleaning group 142 has identical pre-cleaning modules 144; the first main cleaning-group 148 has identical main cleaning-modules 148; the second main cleaning-group 150 has identical main-cleaning modules 152, which can be identical with the main cleaning-modules 152 of the first main cleaning-group 146; and the filling modules 156 of the filling group 154 are identical to each other.

This embodiment of a container treatment machine demonstrates that the treatment machine can also comprise a plurality of separate frames or frame sections and that more than two transport devices can be provided. In addition, only the same type of function modules can also be combined in the function groups, and a diversity of the container treatment machine can be achieved by an appropriate choice of function groups. The function modules of a function group can also optionally form a cohesive group module which, as a unit, can be inserted into and taken out of the container treatment machine.

In the figures, identical reference numbers indicate those parts that are identical or that have the same functions.

The depicted embodiments should not limit the extent of protection of this application, but the invention can be varied within the scope of the dependent claims.

Having described the invention, and a preferred embodiment thereof, what is claimed as new, and secured by Letters Patent is:

1. An apparatus comprising treatment stations for treating containers, and a container-treatment machine to which said treatment stations are connected, said container-treatment machine comprising a frame, first and second parallel transport devices for conveying said containers, and intermediate conveyors, said intermediate conveyors comprising a first intermediate conveyor, wherein said treatment stations are arranged between said first and second transport-devices, wherein said intermediate conveyors convey containers to corresponding ones of said treatment stations, wherein said intermediate conveyors extend transversely between said first and second transport-devices, wherein said treatment stations comprise treatment modules that are held on said frame so as to be removable from operating positions thereof, said treatment modules comprising a first treatment module, and wherein said containers are selected from the group consisting of large cans, small casks, and kegs with valve closures or fittings, wherein said container-treatment machine comprises central fluid lines, wherein said first treatment module comprises peripheral fluid lines, and wherein said apparatus further comprises a fluid interface between said central fluid lines and said peripheral fluid lines, wherein said fluid interface comprises first and second coupling flanges, wherein said first coupling flange is arranged on said frame at an operating position of said first treatment module, wherein said first coupling flange interacts with said second coupling flange, and wherein, as a result of said interaction, said central fluid lines and said peripheral fluid lines are connected to each other.

2. The apparatus of claim 1, wherein said first treatment module is associated with said intermediate conveyor.

3. The apparatus of claim 1, further comprising a guide rail, wherein said guide rail holds said first treatment module to said frame so that said first treatment module can be displaced.

4. The apparatus of claim 1, wherein said first and second coupling flanges interact when said first treatment module is moved to said operating position.

5. The apparatus of claim 1, wherein said first treatment module comprises a first arrangement and said frame comprises a second arrangement, wherein, when said first treatment module is in an operating position thereof, said first arrangement mates with said second arrangement, wherein said first arrangement is selected from the group consisting of first support structures and frame elements, and wherein said second arrangement is selected from the group consisting of second support structures and frame elements.

6. The apparatus of claim 1, further comprising first, second, and third transport sections, said first and second transport sections being constituents of said first transport-device and said third transport section being a constituent of said second transport-device, wherein said first, second, and third transport sections, together with said intermediate conveyors, define a serpentine path that meanders through said container-treatment machine.

7. The apparatus of claim 1, further comprising a third transport-device, wherein said third transport-device is parallel to and adjacent to said first or second transport-devices, wherein said third transport-device is connected to said first intermediate conveyor.

8. The apparatus of claim 7, wherein said third transport-device conveys in a direction contrary to that of at least one of said first and second transport-devices.

9. The apparatus of claim 1, wherein said first intermediate conveyor conveys in a reversible direction such that during a first time interval said intermediate conveyor conveys in a first direction and during a second time interval said intermediate conveyor conveys in a second direction, wherein said first and second directions are opposite directions.

10. The apparatus of claim 1, wherein said first and second transport-devices comprise conveyor belts.

11. The apparatus of claim 1, wherein said treatment modules comprise a cleaning module and a filling module.

12. The apparatus of claim 1, further comprising a controller and an electrical bus system that links said controller to said container-treatment machine for control thereof, wherein said container-treatment machine comprises a first connection element on said frame, wherein said first connection element interacts with a corresponding connection element of said first treatment module when said first treatment module is push-coupled onto said frame, wherein said first connection element and said corresponding connection element of said first treatment module contact each other no later than when the first treatment module has reached its operating position on said frame.

13. An apparatus comprising treatment stations for treating containers, and a container-treatment machine to which said treatment stations are connected, said container-treatment machine comprising a frame, first and second parallel transport devices for conveying said containers, and intermediate conveyors, said intermediate conveyors comprising a first intermediate conveyor, wherein said treatment stations are arranged between said first and second transport-devices, wherein said intermediate conveyors convey containers to corresponding ones of said treatment stations, wherein said intermediate conveyors extend transversely between said first and second transport-devices, wherein said treatment stations comprise treatment modules that are held on said frame so as to be removable from operating positions thereof, said treatment modules comprising a first treatment module, and wherein said containers are selected from the group consisting of large cans, small casks, and kegs with valve closures or fittings, said apparatus further comprising first electrical lines, second electrical lines, a first electrical interface, and a second electrical interface, wherein said first electrical lines and said first electrical interface are constituents of said container-treatment machine, wherein said second electrical lines and said second electrical interface are constituents of said first treatment module, wherein, when said first treatment module is in an operating position thereof, said second electrical interface engages said first electrical interface thereby causing electrical connection between said first and second electrical lines.

14. The apparatus of claim 13, further comprising a push-fit connection to engage said first treatment module and said frame.

15. The apparatus of claim 13, further comprising a detent, wherein said detent secures said first treatment module to said frame at an operating position thereof.

16. The apparatus of claim 13, wherein said first electrical interface and said second electrical interface are arranged to couple with each other when said first treatment module is moved into said operating position thereof.

17. The apparatus of claim 13, further comprising a controller and an electrical bus system that links said controller to said container-treatment machine for control thereof, wherein said container-treatment machine comprises a first connection element on said frame, wherein said first connection element interacts with a corresponding connection element of said first treatment module when said first treatment module is push-coupled onto said frame, wherein said first connection element and said corresponding connection element of said first treatment module contact each other no later than when the first treatment module has reached its operating position on said frame.

18. The apparatus of claim 13, wherein said first treatment module comprises an arrangement that can be actuated such that, when said first treatment module is in an operating position thereof, said arrangement engages at least one of said transport devices in a conveying region thereof, wherein said arrangement is selected from the group consisting of a switchable guide element and a deflector element.

19. The apparatus of claim 13, wherein said treatment modules comprise a cleaning module and a filling module.

20. The apparatus of claim 13, further comprising a third transport-device and a separate transfer conveyor, wherein said third transport-device is parallel to and adjacent to said first or second transport-devices, wherein said third transport-device is connected to said first intermediate conveyor.

21. The apparatus of claim 13, wherein said first and second transport-devices comprise endless conveyors.

22. The apparatus of claim 13, wherein said first and second transport-devices convey in the same conveying direction.

* * * * *